April 2, 1963 N. HARTLEY 3,083,423
AUTOMATIC SUPPLYING, MIXING, MOISTURE CONTROL
AND DELIVERY OF GRANULAR MATERIAL
Original Filed Aug. 6, 1954 11 Sheets-Sheet 3
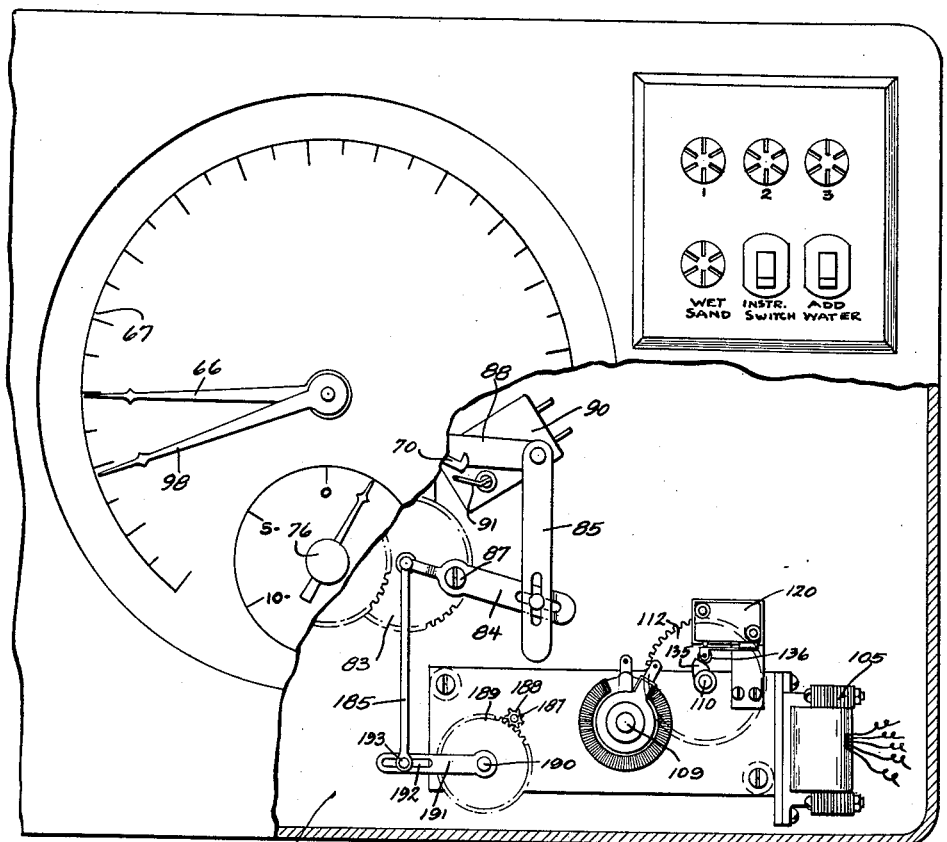
Fig. 3
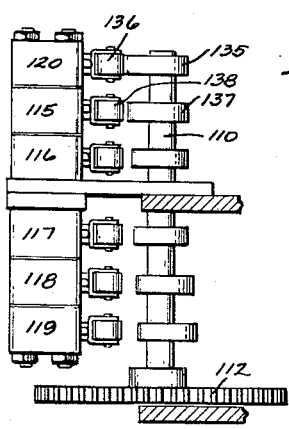
Fig. 6
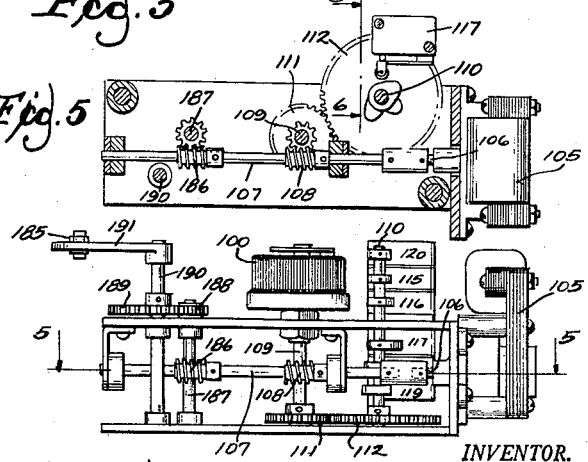
Fig. 5
Fig. 4
INVENTOR.
NELSON HARTLEY
BY
Wheeler, Wheeler & Wheeler
ATTORNEYS INVENTOR.
NELSON HARTLEY
BY
Wheeler, Wheeler + Wheeler
ATTORNEYS

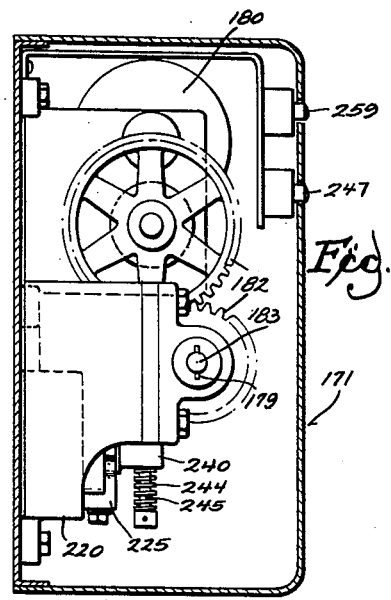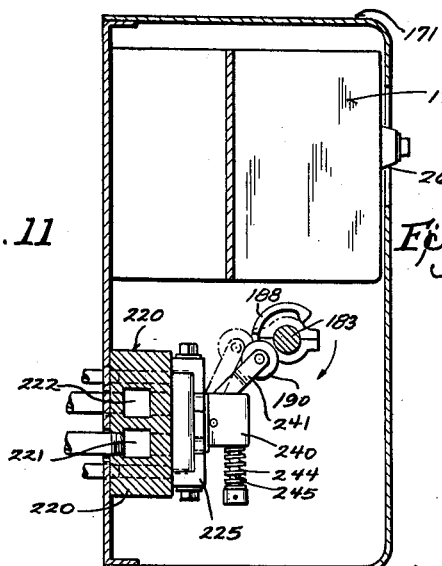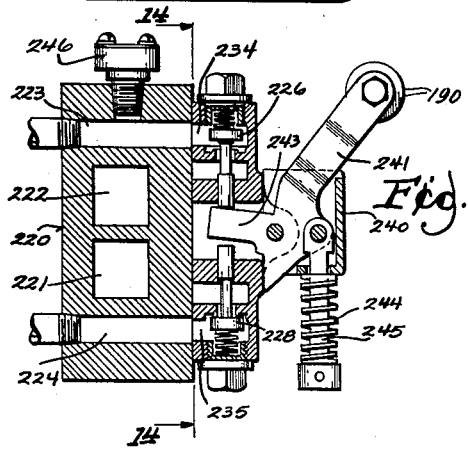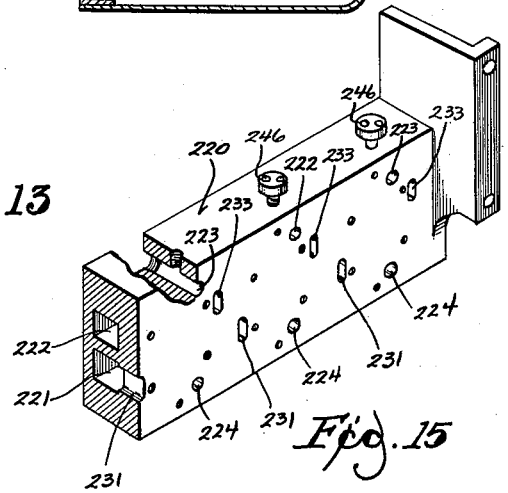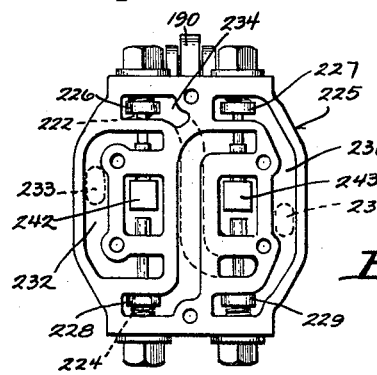

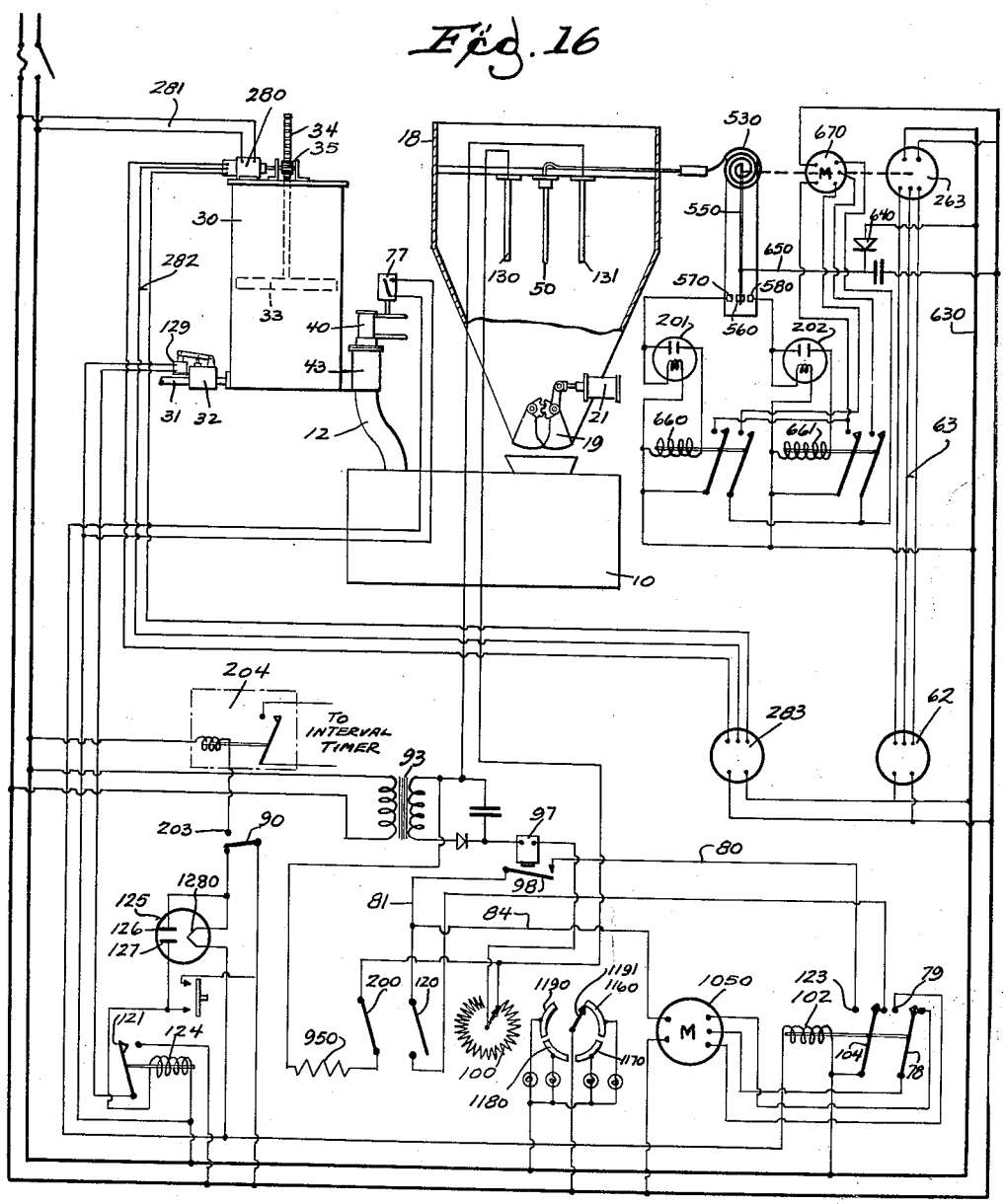

INVENTOR.
NELSON HARTLEY
BY
Wheely, Wheeler & Wheeler
ATTORNEYS

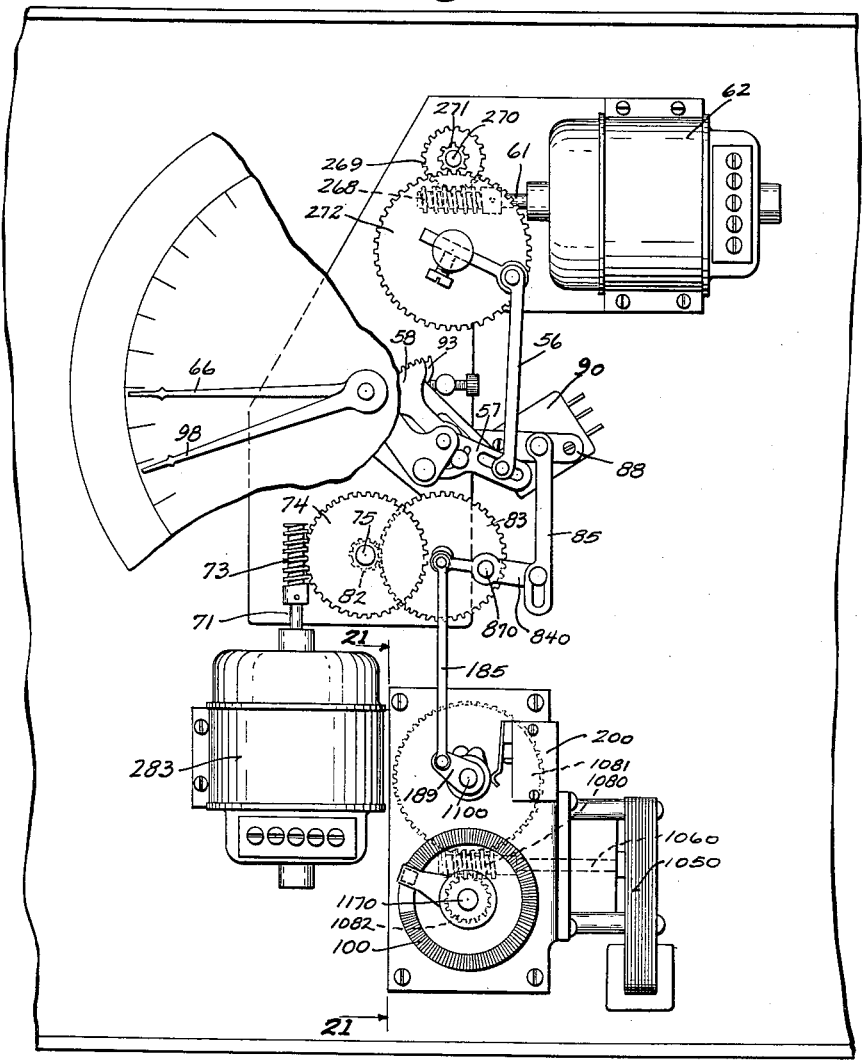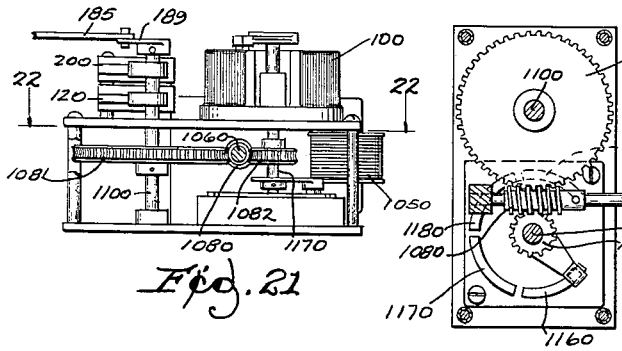

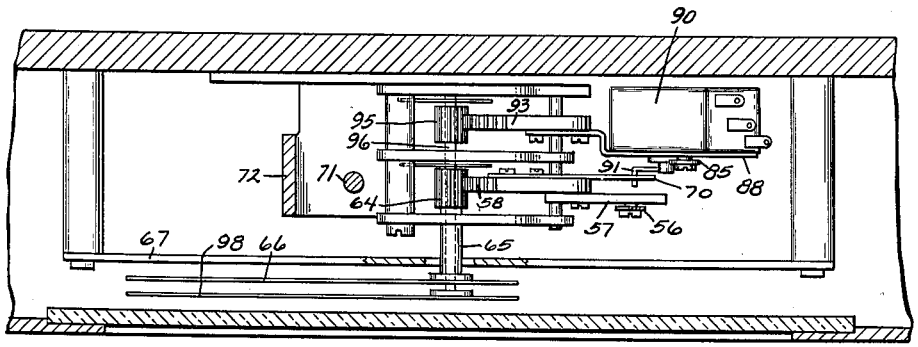

April 2, 1963 N. HARTLEY 3,083,423
AUTOMATIC SUPPLYING, MIXING, MOISTURE CONTROL
AND DELIVERY OF GRANULAR MATERIAL
Original Filed Aug. 6, 1954 11 Sheets-Sheet 10
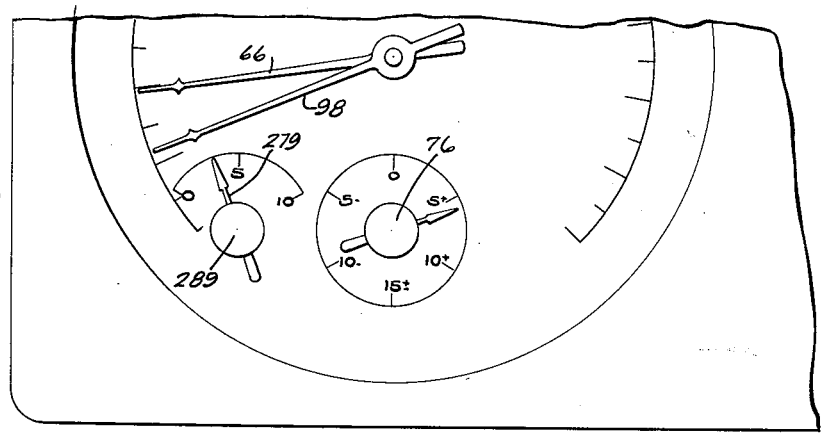
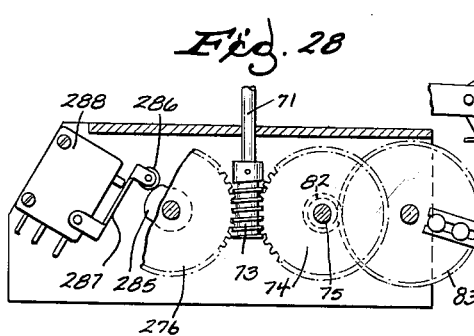
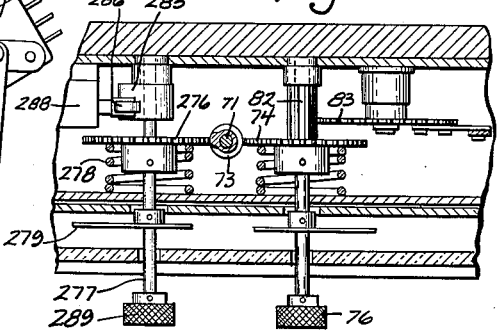
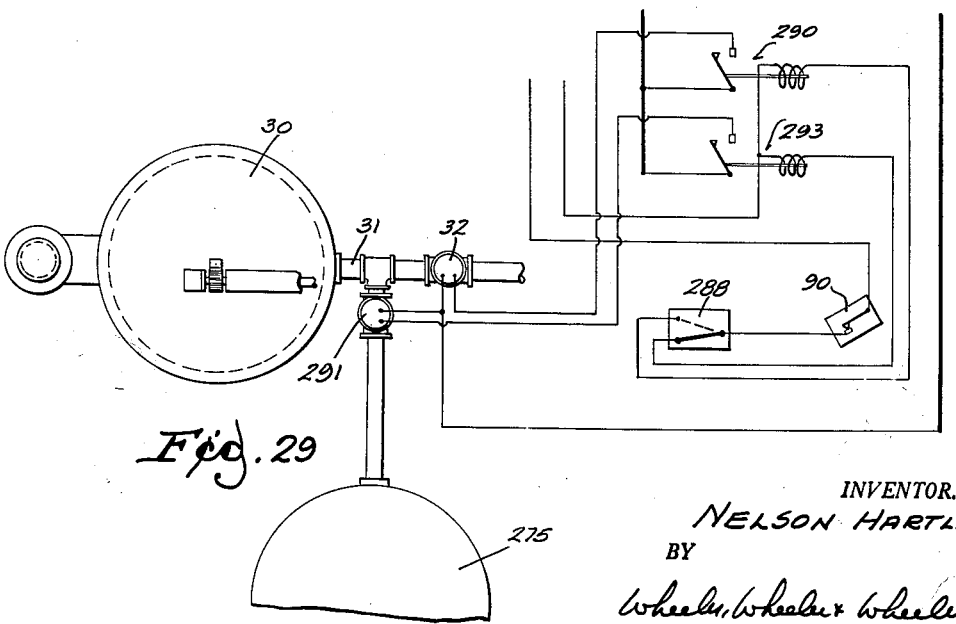
INVENTOR.
NELSON HARTLEY
BY
Wheeler, Wheeler & Wheeler
ATTORNEYS April 2, 1963 N. HARTLEY 3,083,423
AUTOMATIC SUPPLYING, MIXING, MOISTURE CONTROL
AND DELIVERY OF GRANULAR MATERIAL
Original Filed Aug. 6, 1954 11 Sheets-Sheet 11
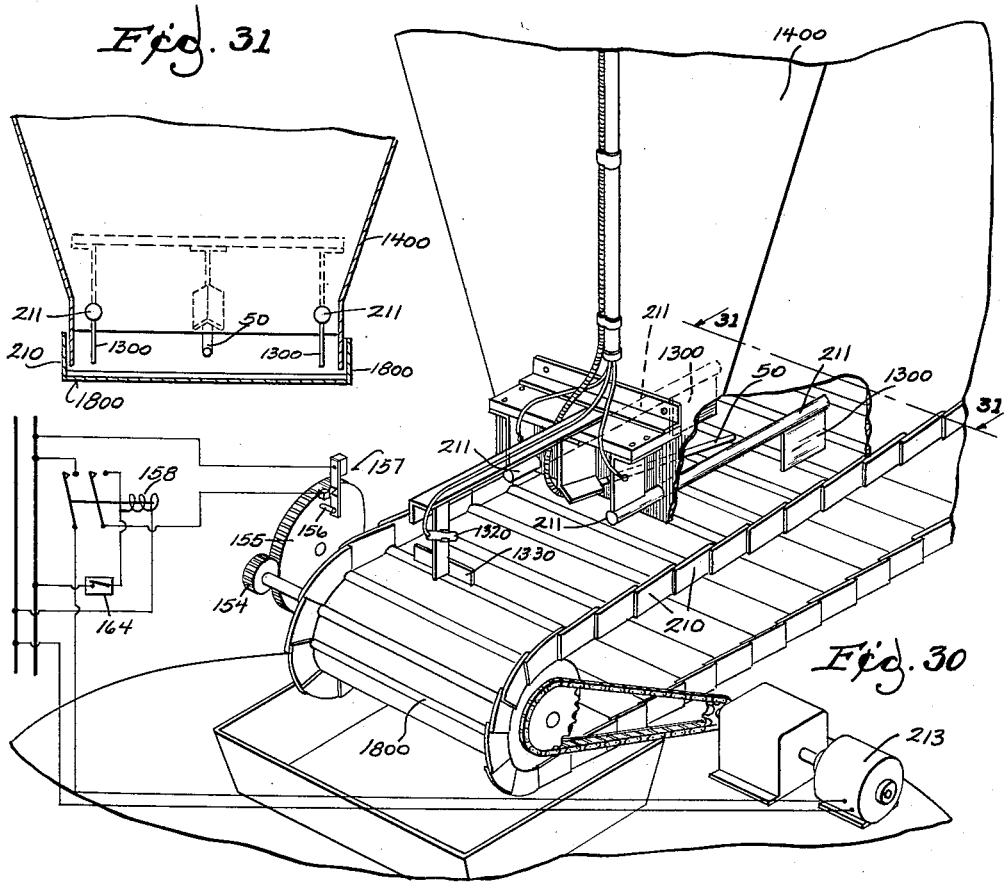
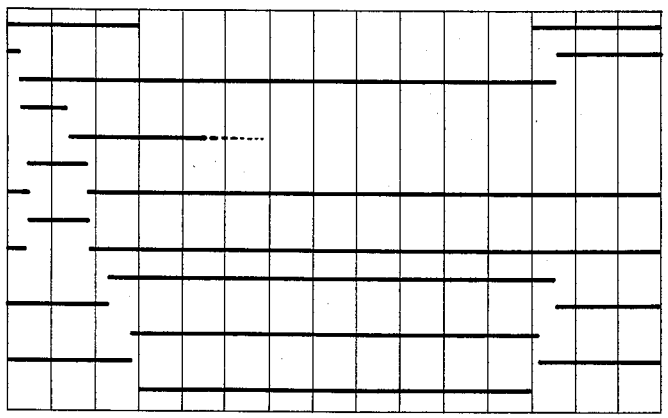
INVENTOR.
NELSON HARTLEY
BY
Wheeler, Wheeler & Wheeler
ATTORNEYS UnitedStates Patent Office 3,083,423
Patented Apr. 2, 1963

3,083,423
AUTOMATIC SUPPLYING, MIXING, MOISTURE CONTROL AND DELIVERY OF GRANULAR MATERIAL
Nelson Hartley, Baltimore, Md., assignor to Hartley Controls Corporation, Neenah, Wis., a corporation of Wisconsin
Continuation of application Ser. No. 448,201, Aug. 6, 1954. This application Sept. 18, 1961, Ser. No. 138,860
25 Claims. (Cl. 22—89)

This invention relates to the completely automatic supplying, mixing, moisture control and delivery of granular material.

This application is a continuation of my copending application Serial No. 448,201, filed August 6, 1954, and is a continuation in part of my copending application Serial No. 373,229, filed August 10, 1953. Cross reference is also made to my United States Patent 2,709,843, which was copending with the applications aforesaid.

The device automatically measures and mixes with the sand an amount of water proportioned to the initial moisture of the sand and to its initial temperature. The control is infinitely variable within its range for the stepless determination of the precise moisture requirements. This is accomplished by passing current between probes or electrodes deeply embedded in the sand in a hopper in which the sand is stored preliminary to delivery into the mixer and by using a circuit in the nature of a Wheatstone bridge to arrest flow of water into the storage tank when the current controlled by a rheostat matches the flow of current betweeen the probes in the sand.

In addition, the device of the present application may automatically control a cycle which is initiated automatically whenever sand is needed in any one of a number of molding stations and which proceeds automatically through the stages of metering, mixing and delivering such sand to the required station or stations, the cycle being self-repeating as long as the demand for sand continues, and automatically terminating when the demand terminates. To this end, I may provide a sand storage bin discharging into the metering hopper above described, subject to the control of gates operated in alternation with those of the hopper. This mixer, into which the hopper dumps, has gates which deliver the sand onto a conveyor belt in a layer of uniform depth as required by the movement of such belt. The belt serves the various molding stations, these having individual hoppers into which sand may be diverted from the belt by automatically actuated and normally retracted plows, the movement of which is subject to the control of electrical probes in the individual molding hoppers and through which current is supplied to relays controlling the operation of the mechanism.

When the mechanism is in operation, the various gates, valves and switches may conveniently be operated by a sequence controller which comprises a cam shaft having cams acting to control the various valves and switches to operate the mechanism in proper sequence. One of the switches actuated by the sequence controller is a switch controlling an interval timer. The timer is simply an electric clock mechanism which, in turn, controls a switch that energizes and de-energizes the motor which operates the cam shaft of the sequence controller. The arrangement is such that when the motor driving the cam shaft is in operation to measure and deliver sand, water and bond into the mixer, the electric clock mechanism of the interval timer is disconnected from the electrical circuit and is at rest. At the conclusion of a cycle of operations of the cam shaft, the circuit to the interval timer clock mechanism is re-established and the timer determines a mixing period during which the mixer functions while the cam shaft is at rest. The circuit to one or the other of the interval timer clock mechanism or the sequence controller cam shaft motor is closed at all times when the device is in operation.

For some purposes, batch measurement of the sand may be done by discharging it to a given depth on a conveyor which is moved from time to time as sand is required. In this instance, the probes which measure the temperature and the water content of the sand are placed adjacent the outlet from the bin to the conveyor and I use in association with the conveyor a paddle engaged by sand when the sand is at the proper depth. Failure of the paddle to be acted upon by the sand either gives warning to the operator or actuates a switch to shut down the entire system until the depth of sand is restored to the predetermined level upon which the accuracy of the metering system is dependent.

In measuring sand by the movement of a conveyor beneath a hopper, it is very important to control the distance of travel of the conveyor rather than the time for which the conveyor motor is in operation. The distance of travel will discharge sand in accurately measured quantities, whereas, the time for which the conveyor operates will not necessarily reflect delivery of uniform batches of sand if the weight of sand in the hopper or the dryness or other condition of the sand as it is delivered onto the hopper affects the speed at which the conveyor will start and move during the time-controlled interval.

In a preferred embodiment, motion is transmitted electrically from the thermometer probe in the sand hopper to the integrating instrument. In order to promote sensitivity and accuracy, means is provided whereby a very small difference in temperature will effect quite a number of rotations of the shaft of a master "Selsyn" motor to produce a corresponding number of rotations of the shaft of the driven or slave motor at the integrating instrument. Means is also employed to damp vibration and preclude hunting.

In the drawings:

FIG. 3 is a view in front elevation of integrating mechanism for measuring a supply of water proportioned to the moisture and temperature of the sand with which it is to be mixed, portions of the front wall of the instrument being broken away to expose its interior construction.

FIG. 4 is a bottom plan view of a portion of the apparatus shown in FIG. 3, wherein current passing between the probes in the sand hopper is integrated with current proportioned to the amount of water required.

FIG. 5 is a view taken in section on line 5—5 of FIG. 4.

FIG. 6 is an enlarged detail view in side elevation in the plane indicated at 6—6 of FIG. 5.

FIG. 11 shows the device of FIG. 7 in section in the plane indicated at 11—11 in FIG. 7.

FIG. 12 is a view taken in section on the line 12—12 of FIG. 7.

FIG. 13 is a view taken in section on an enlarged scale on the line 13—13 of FIG. 7.

FIG. 14 is a view taken on the line 14—14 of FIG. 13.

FIG. 15 is a view in fragmentary perspective showing a portion of the manifold illustrated in FIGS. 11, 12 and 14.

FIG. 16 is an electric circuit diagram of a modified embodiment of the invention.

FIG. 20 is a view of the integrating device of the embodiment of FIG. 16 as it appears in fragmentary front elevation.

FIG. 21 is a view in side elevation of a portion of the apparatus as seen from the plane indicated at 21—21 in FIG. 20.

FIG. 22 is a detail view taken in section on the line 22—22 of FIG. 21.

FIG. 23 is a detail view in transverse section through the integrating instrument.

FIG. 24 is a view fragmentarily illustrating the integrating mechanism in front elevation, portions thereof being broken away.

FIG. 25 is a view similar to FIG. 24 but in a somewhat different plane, portions of some of the parts being broken away.

FIG. 26 is a view of a modified integrating instrument fragmentarily illustrated in front elevation.

FIG. 27 is a view taken in section through the instrument on the line 27—27 of FIG. 26.

FIG. 28 is a view taken in section transversely through the structure of FIG. 27, portions of one of the gears being broken away.

FIG. 29 is a view diagrammatically showing a part of the control circuit to illustrate the use of a modified embodiment, the water metering tank and an auxiliary tank for supplying slurry being shown in plan.

FIG. 30 is a view in perspective showing a modified arrangement for delivering sand from the supply hopper to the mixer by conveyor, portions of the wall being broken away.

FIG. 31 is a view showing the structure of FIG. 30 in transverse section looking forwardly in the direction of conveyor movement.

FIG. 32 is a chart showing the functioning of various parts of the apparatus in a complete cycle.

Figure 1:
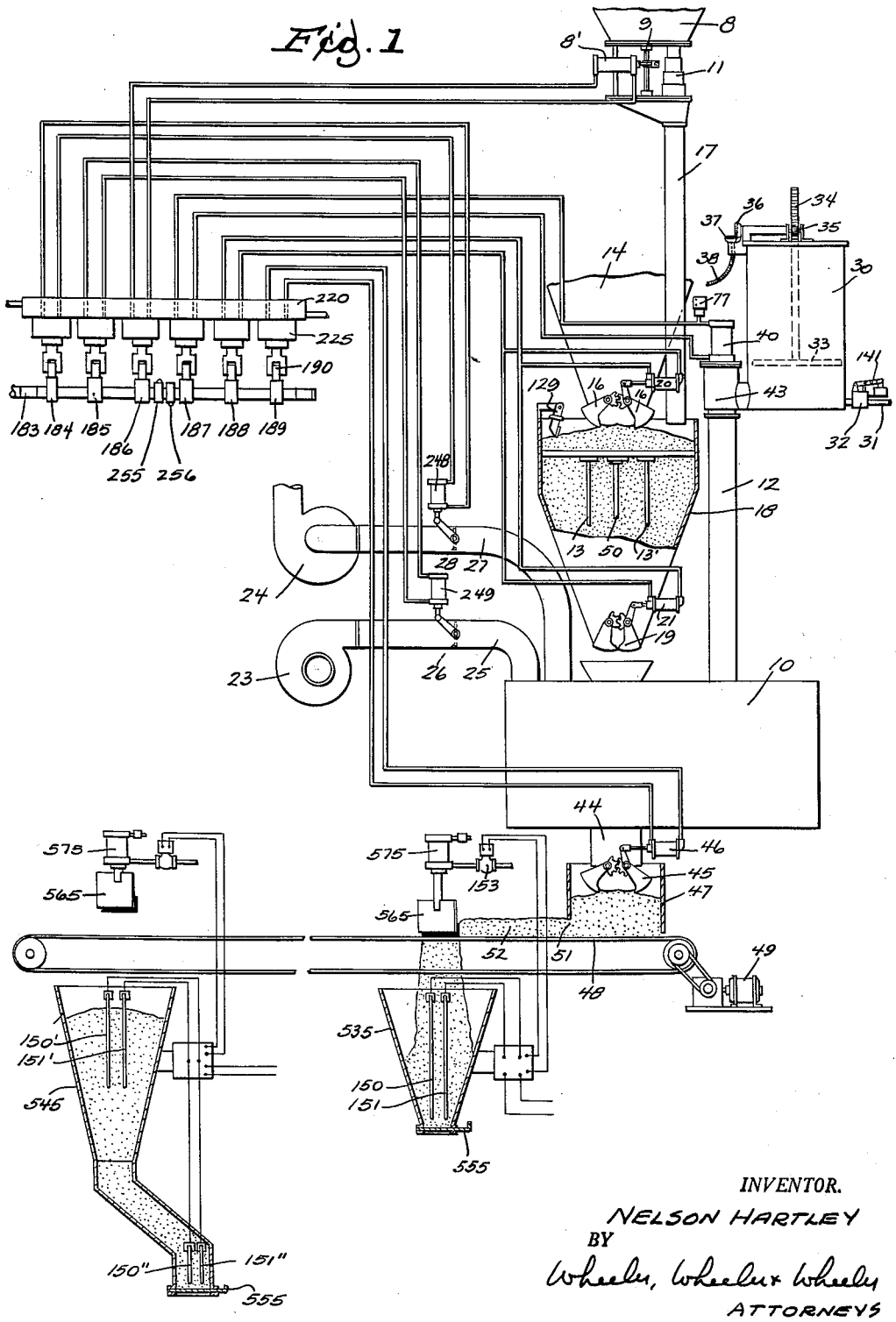
FIG. 1 is a diagrammatic general view of apparatus embodying the invention with particular reference to the connections for the operation of the various valves and switches.

The general organization is as follows:

A sand storage bin is shown at 14. Sand is delivered therefrom subject to the control of the gates 16 actuated by air cylinder 20, into the batch hopper 18, where automatic readings of its moisture and temperature are taken by electric probes 13 and thermometer bulb 50 in a manner hereinafter described. From this hopper, the sand is discharged subject to the control of the gates 19 into the muller or mixer 10. Gates 19 are operated by an air cylinder 21. The mixer 10 may be of any appropriate type. In practice, I have used a device similar to that shown in U.S. Patent 2,593,327.

Water for the batch discharged from batch hopper 18 into the mixer 10 is supplied from a batch measuring water tank 30. Water enters the tanks through pipe 31 subject to the control of a solenoid actuated valve 32. The batch of water accumulated in tank 30 is determined by a float 33 in the tank to which is connected a rack 34 meshing with a pinion 35 from which motion is transmitted through bevel gears 36 and 37 and shaft 38 toward the integrating device hereinafter to be described. Since it is important that the water move rapidly from the tank 30 to the mixer, I provide a large communicating pipe at 12 through which the water is dumped from the tank subject to the control of a valve at 43 controlled by air cylinder 40.

Since the present device is fully automatic, it incorporates means for delivering either powdered bond or slurry, as may be required, into the mixer to be incorporated in the batch of sand and water mixed therein. If the bond is dry, it is in a bin 8 from which it passes into a metering chamber 11 having telescopically related wall sections. The capacity of the chamber is varied by sliding the sections upon each other to vary the length of the chamber.

The rock shaft 9 oscillated by air cylinder 8' opens and closes valves at the top and bottom of the chamber respectively (the valves are not shown in this application), the arrangement being such that when either is open the other is closed. In this way, measured quantities of the powdered bond can be successively delivered through the pipe 17. When the bond material is dry, the pipe 17 preferably discharges into the sand hopper 18 rather than directly into the muller.

When the bond is in the form of slurry, it is preferably delivered into the water measuring tank 30 from the slurry supply tank 275 shown in FIG. 29. Since the slurry is largely water, it is included as a part of the batch accumulated in tank 30 in an amount integrated with the moisture content and heat of the sand, a special integrating instrument being used as hereinafter described in connection with FIGS. 26 to 29 of the drawings.

As suggested in U.S. Patent 2,593,327, I prefer to use a pair of blowers at 23 and 24 connected with the mixer. Blower 23 introduces fresh air into the mixer through pipe 25 subject to the control of damper 26. Blower 24 withdraws dust and air from the mixer through pipe 27 subject to the control of damper 28. The respective dampers are operated pneumatically in a manner hereinafter to be described. The blowers are left in constant operation so that air flow can be instantly established or cut off by manipulation of the respective dampers.

When the operation of mixer 10 is complete, the batch of sand is discharged from the bottom of the mixer through the pipe 44 subject to the control of the valve gates 45 which are operated by air cylinder 46. The flow passes into a chamber 47 whose bottom is formed by conveyor belt 48 operated by motor 49 to move from right to left as viewed in FIG. 1. At the side of the chamber toward which the belt 48 moves, there is an opening 51 which permits a layer 52 of molding sand to move with the belt at a substantially uniform depth thereon. The belt 48 serves any desired number of molding stations, where each molder is provided with stored molding sand in a hopper 535 or 545 from which he can withdraw the sand through a gate 555 as needed. At each station, there is a normally retracted plow 565 which may be lowered into engagement with the conveyor 48 to deflect into the underlying hopper 535 or 545 some of the sand moving with the conveyor. Each of the plows 565 is operated between the retracted position shown over hopper 545 and the advanced or operative position shown over hopper 535 by means of an appropriate air cylinder 575 actuated automatically in the manner hereinafter to be described.

The automatic operation is such that when all of the several hoppers 535, 545, etc. contain a sufficient quantity of molding sand to meet immediate requirements, the operation of the conveyor 48 ceases and the entire apparatus shuts down. During normal operation, this will seldom, if ever, happen. One or another of the molder's hoppers will constantly require replenishment and the automatic mixing and delivery of the sand will continue to satisfy these requirements. Assuming that the apparatus is temporarily shut down, the arrangement is such that as soon as any one of the hoppers requires additional molding sand, the conveyor 48 will start to operate for the delivery of the required sand and the rest of the apparatus will resume operation for the automatic mixing of another batch and discharge thereof into the supply chamber 47 through which the conveyor 48 operates.

Having now described the general organization of the device, I shall describe its individual components.

An integrating instrument is generically designated in FIG. 3 by reference character 60. The sand which reaches the batch hopper 18 from the bin 14 may vary widely as to its temperature and moisture content. By adjustment of the knob 76 to rotate its pointer over the illustrated scale, the operator may select the general moisture conditions he desires to maintain. However, if the sand is hot, an excess of water should be introduced into the batch. Accordingly, the integrating instrument serves to permit a variation of the amount of water introduced into the measuring tank 30 according to the temperature of the particular batch of sand accumulated in the batch hopper 18. The initial moisture content of the sand further affects the requirements and the integrating instrument 60 is further adapted to take this into account in determining the amount of water measured in tank 30 for delivery into the batch.

To accomplish these results, the solenoid valve 32 which permits water to enter the measuring tank 30 is controlled by a sensitive switch 90 which is normally closed and has a contact actuator at 91 positioned for engagement with an arm 70. The point at which such engagement is effected to open switch 90 can be varied either by movement of the arm 70 or by bodily movement of the switch 90. Such bodily movement, from a starting point determined by the manual setting of knob 76, occurs automatically as a function of sand moisture and the rising of the float 33 in the water metering tank 30.

While it is possible to operate the arm 70 directly from a Bourdon tube with which the thermometer probe 50 in hopper 18 directly communicates, it is preferred to provide an electrical power operated connection between the thermometer and the arm 70 and thereby substantially completely to relieve the Bourdon tube of load.

Figures 17, 18:
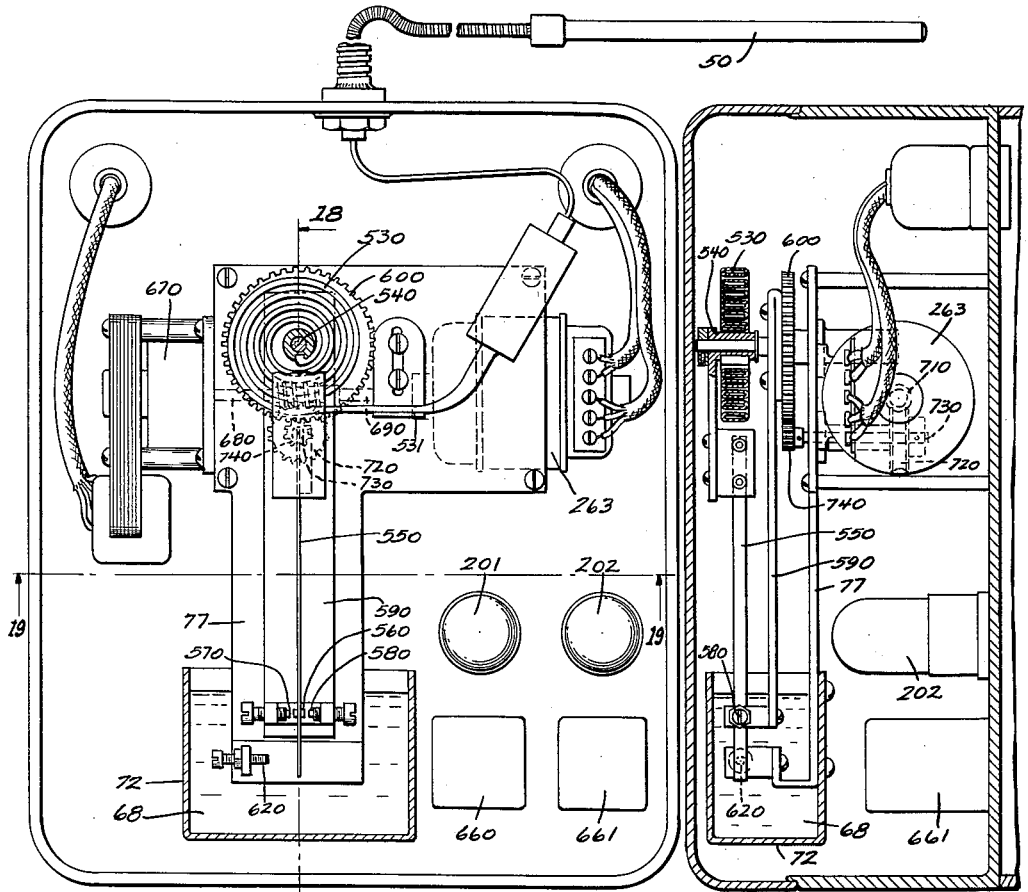
FIG. 17 is a detail view on an enlarged scale showing the manner in which such connections are applied to a thermometer illustrated in FIG. 16.
FIG. 18 is a fragmentary view in section on line 18—18 of FIG. 17.
Figure 19:
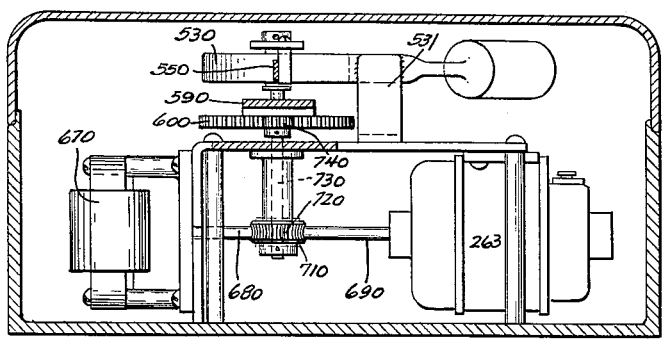
FIG. 19 is a view taken in section on line 19—19 of FIG. 17.

The probe 50 in the sand hopper communicates with the helically wound Bourdon tube 530 (FIGS. 17 to 19). The outer end of the tube is anchored at 531. Its temperature-responsive inner end is fastened to the rock shaft 540, from which depends an elongated and very flexible spring contact arm 550 provided at a point near its free end with contact 560 centered between adjustable contacts 570, 580. These are mounted on oscillatory support 590 carried by gear 600 which rotates co-axially with rock shaft 540. Through this gear, the contacts 570, 580 are movable by power to follow the movement of the spring contact arm 550 and to maintain themselves in a position in which contact 560 is centered between them. The free end of the spring contact arm 550 projects beyond contact 560 to a position for engagement with an adjustably fixed stop 620 which limits the movement of the arm in the direction in which it moves as the Bourdon tube responds to temperature decrease.

The armature shaft 680 of motor 670 is directly connected with the armature shaft 690 of the master "Selsyn" motor 263. At an intermediate point the armature shaft 680 carries a worm 710 meshing with worm gear 720 on shaft 730. Pinion 740 on shaft 730 meshes with gear 600 to oscillate the supporting arm 590 which is mounted thereon. Due to the very substantial reduction in the worm and worm gear 710, 720, as well as in the pinion 740 drive to gear 600, it will be apparent that a number of revolutions of armature shafts 680 and 690 will be required to effect a very slight angular movement of the contact supporting arm 590. Thus an almost infinitesimal movement of the spring contact 550 connected with the Bourdon tube will bring about many revolutions of the master "Selsyn" 263.

The electrical connections shown in FIG. 16 are such that when movement of the spring contact arm 550 is to the left, as viewed in FIGS. 16 and 17, a circuit is closed through contacts 560 and 570. This establishes a circuit from the supply line 630 through rectifier 640 and conductor 650 to relay coil 660. The closing of this relay energizes motor 670 for rotation of its armature shaft in a direction such that the supporting arm 590 is driven clockwise by motor pinion 740 and gear 600 to follow the direction of oscillation of the spring contact arm 550 to re-center contact 560 between contacts 570 and 580.

Similarly, a movement of the spring contact carrier 550 to the right, as viewed in FIGS. 16 and 17, will cause contact 560 to engage contact 580 thereby closing the circuit to relay 661. The closing of this relay energizes motor 670 to rotate reversely from the direction above described, thereby rotating the shaft of the master "Selsyn" 263 and bringing about counterclockwise rotation of the contact supporting arm 590 in the course of a number of rotations of the shaft of master "Selsyn" 263 in a direction opposite to that first described.

Once again, the circuit to the actuating motor 670 and the consequent movement of the master "Selsyn" 263 is interrupted as soon as arm 590 has followed the spring arm 550 to recenter contact 560 between contacts 570 and 580, thus opening the circuit to relay 661.

The conventional three-wire connection provided at 63 from the driving "Selsyn" 263 to the slave or driven "Selsyn" 62 causes the armature shaft of the latter to move in unison with the armature shaft of the master unit 263. The armature shaft 61 of slave unit 62 carries a worm 268 meshing with worm gear 269 on shaft 270. The pinion 271 on this shaft actuates a gear 272 to which there is pivoted a link 56. The link is adjustably pivoted at one side of the lever 57 mounted on segment 58, which meshes, as best shown in FIG. 23 and FIG. 24, with a pinion 64 on sleeve shaft 65 which carries pointer 66. On its other face, the segment 58 carries the trip arm 70, upon engagement with which the switch actuator 91 opens the contacts of the switch 90.

Since the motor 670 provides all required power, and since the "Selsyn" drive involves a number of shaft rotations in response to even one degree of temperature change, the thermometer is substantially wholly relieved of load. The length and flexibility of the spring arm 550 are such that this arm offers little resistance to continued movement of the Bourdon tube even when its contact 560 is engaged with one of the contacts 570 or 580, or with the stop 620. This stop, in practice, limits the spring arm 550 to prevent it from going beyond the position which it occupies when the thermometer bulb 50 is exposed to a temperature of 70° F. Thus the response is very sensitive and very accurate.

Excessive vibration and hunting, as well as arcing between the contacts may be prevented if need be by immersing the lower end of the spring contact carrier arm 550 and arm 590 in a bath 68 of oil, or other suitable quenching liquid, in container 72. The container 72 may conveniently be mounted on the bracket 77 which supports the adjustable stop 620.

The switch 90 is bodily movable to and from the point of engagement between arm 70 and switch actuator 91, its movement being effected in part by sand moisture as hereafter described and in part by the flexible shaft 38, operated by the float 33 in the water measuring tank 30 and connected to drive pinion 83 in the integrating instrument.

In an alternative electrical drive from the float 33 in tank 30 to the integrating device, the rack 34 (FIG. 16) and pinion 35 drive the armature shaft of the master "Selsyn" motor 280, which has a current supply line 281 and has a three wire connection 282 to slave motor 283 (FIG. 20), the armature shaft of which drives the shaft 71 to actuate gear 83 through worm 73, worm wheel 74, knob shaft 75 and pinion 82.

Axial movement of knob 76 (FIG. 26) preliminary to setting its pointer retracts the shaft 75 to withdraw worm gear 74 from worm engagement, permitting shaft 75 to rotate with the pointer to adjust arm 840. Re-engagement of the worm gear re-couples the drive. This setting is used to provide for introduction of any desired amount of water in each operation prior to initiation of automatic control in accordance with temperature. Some water is required regardless of temperature or initial moisture. The operator may set this amount by manipulating knob 76. Lost motion between link 85 and arm 840, accommodated by the slot in the link, varies according to the setting of the knob. After the pintle reaches the end of the slot, further water addition is in proportion to temperature, as modified by moisture already in the sand. The means for integrating these factors will shortly be described.

The amount of water in the tank 30 is visually indicated by mounting the switch 90 on an arm 88 carried by segment 93 which meshes with pinion 95 on shaft 96 which carries pointer 98, operating across the face of dial 67. Shaft 96 is mounted coaxially with temperature responsive sleeve shaft 65 and pointer 66. As the tank 30 fills, pointer 98 will move toward registry with the thermometer pointer 66 and the arrangement is such that when the pointers register, the arm 70 and the switch actuator 91 will engage to open switch 90, thereby closing valve 32 to shut off admission of water into the measuring tank 30. The higher the temperature, the greater the amount of water that will have to be admitted into tank 30 before the pointers will register and the switch will open.

I have provided an infinite ratio proportioning means in which, throughout its range, the displacement of link 185 is exactly related to the sand moisture. Thus the sand moisture as well as the temperature becomes a factor in determining the amount of water which will be admitted into the measuring tank 30 before the valve 32 shuts off in consequence of the opening of switch 90.

The initial wetness of the sand in the batch hopper is very accurately related to the amount of current which will pass between the probes 13 and 13′ and the compensating adjustment of the switch to reduce the amount of water to be admitted to the tank for incorporation in the batch is accurately determined by balancing the extent of lost motion, as determined by the resistance of the rheostat, against the amount of current which is flowing.

Figure 2:
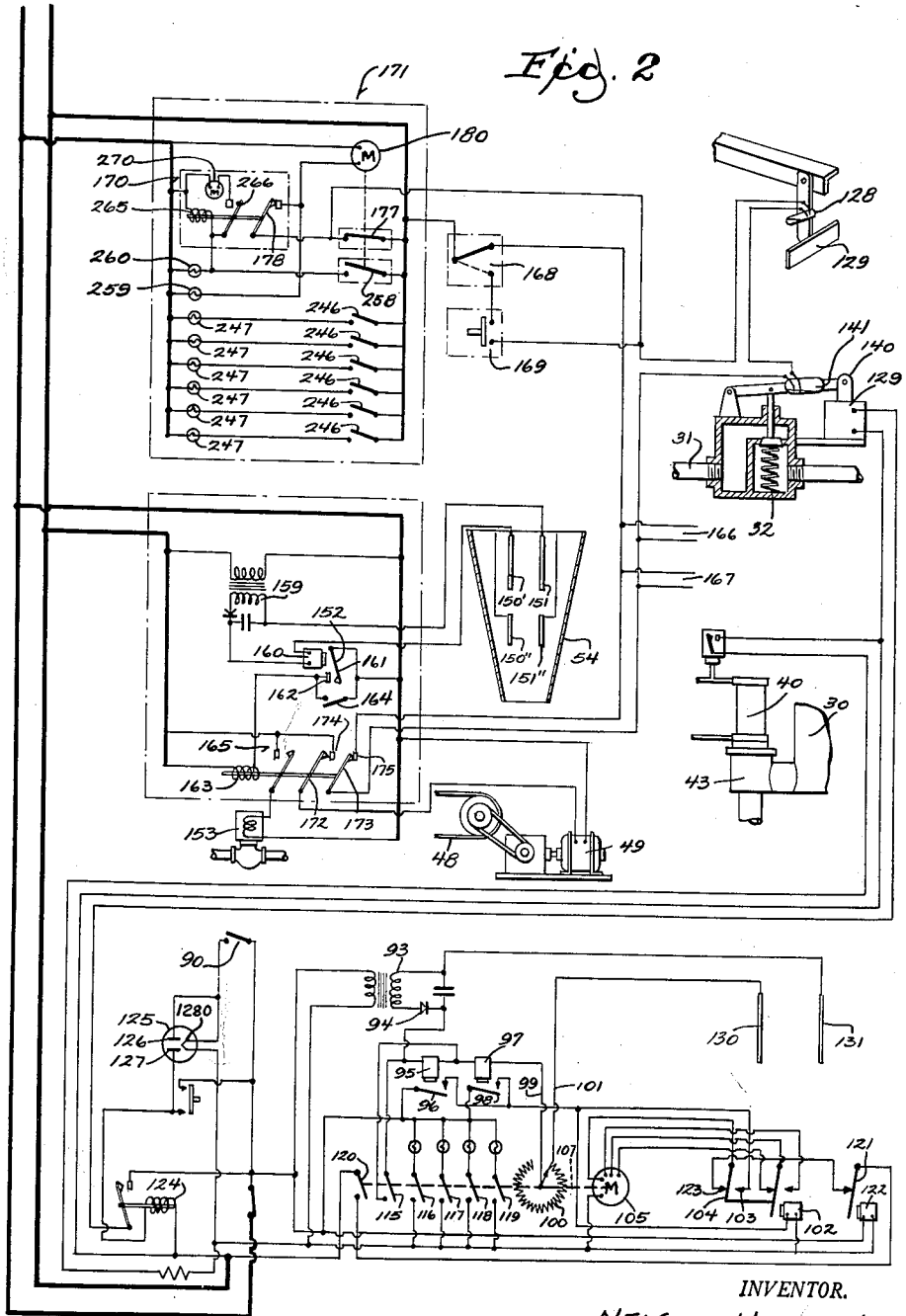
FIG. 2 is a diagrammatic showing of the electrical circuits related to the mechanism illustrated in FIG. 1.

The lower portion of the diagram shown in FIG. 2 illustrates one way in which this result is accomplished. I have previously referred to the probes 130 and 131 in the sand batch hopper 18. These are illustrated in FIG. 2, which shows them supplied with rectified current from the transformer secondary 92 and rectifier 94. One side of the secondary is illustrated as being connected directly with probe 131. The other side connects to the winding of a relay 95 which may be, for example, of a type which will close its contacts when a current of 5 milliamperes or more passes through it. This winding is connected with the winding of a second relay 97 which may, for example, be of a type which will close its contacts when 10 milliamperes passes through it. These figures are given solely by way of example and are not intended to limit the choice of values for these relays.

From the winding of the relay 97, lead 99 goes to the variable contact of a rheostat 100, the resistance of which is connected by conductor 101 to probe 130.

Energization of the first relay 95 establishes a circuit to a double pole relay 102. At the same time, relay 95 energizes the contact 103 of relay 102 so that, upon energization of relay 102, current passes from contact 103 thereof to the moving contact 104 thereof to initiate forward rotative motion of the extended armature shaft 107 of motor 105.

An appropriate mechanical organization is shown in FIGS. 4 and 5. The armature shaft 106 of motor 105 drives shaft 107 on which worm 108 drives cross shaft 109 to rotate the moving contact of rheostat 100. Shaft 109 also drives a cam shaft 110 through gears 111 and 112. The cams on this shaft operate in proper sequence a series of switches as shown in FIGS. 2, 5, and 6.

The very first movement of the cam shaft 110 closes switch 120 for supplying current to the moving contact 121 of relay 122. It is the ultimate function of contact 121 to control a supply of current to the contact 123 of the relay 102 and to act as a limit switch to interrupt a reversing circuit to the motor 105 during a later operation in which motor 105 rotates cam shaft 110 back to its starting point. Since the reversing circuit is not established except at the conclusion of a cycle of operation of the cam shaft 110, the mere closing of switch 120 at the commencement of the cycle has no effect on the continued rotation of the cam shaft beyond the point at which switch 120 is initially closed.

The second switch to be closed is switch 115. Action of cam 137 on cam follower 138 actuates switch 115, which closes a shunt circuit around relay 95, whereby its contact 96 resumes its normally open position. If the amount of current passing between the probes 130 and 131 has been inadequate to actuate relay 97, this terminates the movement of the parts for the time being, the motor being thereupon deenergized. However, if relay 97 has been energized, the motor 105 will continue to be supplied with current through the contacts 98 of relay 97 and the rotation of shaft 107 will continue.

Switches 116, 117, 118 and 119 merely control the pilot lights diagrammatically illustrated in FIG. 2 for the purpose of giving the operator information of the approximate range in which the water control is functioning.

In the preferred embodiment incorporating the proportioning means as shown in FIGS. 16 and 20 to 22, the lever 88 which supports switch 90 is connected by link 85 with a lever 840 that is pivoted at 870 upon the gear 83. The inner end of lever 840 overlies the gear and projects substantially to the axis thereof, where it is attached to another link 185. In so far as the link 185 remains stationary, lever 840 will move with the gear. In so far as link 185 moves longitudinally, its movement will affect the otherwise direct communication of motion from the gear to the switch, either adding to or subtracting from the extent of such motion according to the direction of displacement of link 185.

In the FIG. 3 embodiment, adjustments to control the effect of the motor rotation upon the position of switch 90 can be made by shifting the pivot bolt 193 in the slot 192 until the functioning of this apparatus accurately reflects the desired correction of the position of switch 90 in accordance with the amount of water already in the sand. In the FIG. 20 embodiment, like means of adjustment may be used if needed.

When the shaft 107 is rotated by motor 105 to a position determined by a correlation of the rheostat 100 to the amount of current flowing between the probes 130 and 131, the object of such rotation is to adjust the position of the link 185 to vary the extent of lost motion permitted between gear 83 and lever 85 by the slot in lever 85. The result is to modify the position of bodily movement of switch 90 from that which would otherwise be determined, first, by the manual setting of gear 83 and, secondly, by the amount of water admitted into the measuring tank was reflected in movement communicated from the float through slave motor 283 and gears 73, 74, 82 and 83.

To achieve this result, shaft 107 in FIGS. 4 and 5 is provided with a worm at 186 which drives a cross shaft 187 carrying a pinion 188 meshing with a gear 189 on a rock shaft 190. The arm 191 on rock shaft 190 is slotted at 192 to receive a pivot bolt 193 to which link 185 is connected. In the construction of FIGS. 20 to 22, the arm 189 is mounted on cam shaft 1100.

In the preferred embodiment shown in FIG. 16 and FIGS. 20 to 22, the armature shaft 1060 of the motor 1050 uses a single worm 1080 to drive two worm gears 1081 and 1082, respectively carried on the cam shaft 1100 and 1170. The cam shaft operates switches 120 and 200 as above described. However, the pilot light switches 116, 117, 118 and 119 are replaced by the corresponding segments 1160, 1170, 1180 and 1190 successively engaged by a moving contactor 1191 carried by shaft 1170.

The circuit illustrated in FIG. 16 is also different in detail from that shown in FIG. 2. The motor controlling relay coil 102 is connected in series with a normally open pressure switch 77 connected in the pneumatic pressure line to the cylinder 40 which controls the dump valve 43 from the water metering tank 30. Whenever valve 43 is closed to condition the tank 30 to receive or retain the water, the switch at 77 also closes to engage the moving contactor 104 of relay 102 with contact 123. At the same time, the contactor 78 of this relay engages the contact 79. The contactor 78 of the relay determines whether the motor is to operate in a forward or reverse direction. The contactor 104, upon engagement with contact 123, establishes a circuit through line 80 to relay 97 which is connected through lines 81 and 84 to the motor 1050. Since contact 98 of relay 97 is normally open, the motor 1050 does not move until current begins to flow between the probes 130 and 131. As soon as current thus flowing reaches an adequate value to close the contact 98 of relay 97, the current to motor 1050 is completed and the motor begins to operate its armature shaft to actuate the switches 200 and 120 and the contact of rheostat 100 and the contactor 1191 as already described.

Rheostat 100 introduces a progressively increasing resistance into the circuit of relay 97. When this relay finally drops open, the motor stops. When pressure switch 77 opens, relay 102 moves back to the normal position in which it is illustrated in FIG. 16. The motor circuit is now completed through contact 86 of relay 102 and through limit switch 120 and the motor operates in reverse until it returns to the starting point, whereupon the opening of the limit switch 120 arrests further movement of the motor shaft. This leaves the parts in readiness for another cycle of operation.

The operating connections from the sensitive integrating switch 90 to the valve 32 which controls admission of water into the measuring tank 30 include a circuit closing relay 124 and means for delaying the immediate response thereof. The object of the delay is to give ample time for the thermometer bulb 50 in the batch hopper to respond to the temperature of the sand which surrounds it. I have found it convenient to use a vacuum tube 125 to perform the delaying function. The circuit to the relay 124 must pass between the plates 126 and 127 of the tube and no current will flow until the filament 1280 has had time to heat, following the closing of switch 90. When the filament has heated and current flows between the plates 126 and 127, the relay 124 is energized to control the circuit to the solenoid 129. The armature 140 of this solenoid is connected by lever 141 with the water valve 32 in a manner such that the valve is open whenever the solenoid 129 is actuated. As above stated, the sensitive switch 90 opens to deenergize this solenoid as soon as the amount of water entering the measuring tank 30 moves the switch 90 bodily to a position in which its actuator 91 engages the finger 70 at the position to which such finger has been moved by the mechanism responsive to the temperature of the sand.

One difference between the circuit of FIG. 16 and that of FIG. 2 involves elimination of the relay 95 shown in FIG. 2. I have found that a resistor 950 of 3500 ohms may be substituted in the circuit connected in series with probe 130 through the switch 200.

Delayed action relays are desirably used at 201 and 202 in series with the contacts 570 and 580 of the Bourdon tube instrument which responds to temperature of the sand. These are not essential but desirable to prevent hunting. If they are not used, the sensitive spring arm 550 will vibrate in response to any mechanical stimulus such as the passing of a truck or a train.

Another innovation in the circuit of FIG. 16 as compared with that of FIG. 2 involves the use of a double throw switch at 90 in the integrating device. When the switch 90 opens to arrest the metering of water into tank 30, its contact closes the circuit through contact 203 to a relay 204 connected to the timing device which is shown at the upper left in FIG. 2 and elsewhere described. This makes the functioning of the timing device dependent on the conclusion of the function of the integrating instrument. The circuit is used as a substitute for the interlocking mercury switches shown at 141 and 128 in FIG. 2.

It will be recalled that the shaft 71 of the integrating instrument is driven from a float in water measuring tank 30 to operate worm gear 74. For slurry control, a second worm gear 276 as shown in FIG. 28 meshes with worm 73 opposite worm gear 74. Worm gear 276 is mounted on shaft 277 for rotation. It is also axially movable with the shaft against the bias of the spring 278. It carries a pointer 279 operating over a scale on the dial. It also carries a cam 285 engaged with a cam follower 286 on an actuator 287 for switch 288. As shown in FIG. 29, switch 288 is a double throw switch and is in series with the integrating switch 90.

The knob 289 on the shaft 277 enables the shaft 277 to be pulled axially outwardly to withdraw its worm gear 276 from mesh with worm 73, whereby the shaft may be rotated free of engagement with the worm to locate the pointer 279 at any desired location on dial 280 and to locate its cam 285 in a corresponding relation beneath the cam follower 286 to determine the interval of shaft rotation before the cam follower drops from the cam to permit the shift of switch 288 from the position shown in FIG. 29 to its alternate double throw position. Once the shaft is rotated to set it in a position to give the required amount of slurry, it is released to permit its spring 278 to reengage worm gear 276 with worm 73. Thereupon, according to the length of cam travel beneath the cam follower during the initial operation of the worm, the switch 288 will remain in its first position for a greater or shorter length of time before dropping into its dotted line position of FIG. 29.

With the switch 288 in the full line position shown in FIG. 29, and the integrating switch 90 closed, as shown in that view, the first thing that will happen will be the closing of relay 290 to energize solenoid valve 291 for delivering slurry into the supply pipe 31 leading into the water measuring tank 30. This will cause the float 33 in such tank to rise. Ultimately the motion communicated from the float to the shaft 71 of the integrating instrument will rotate the cam 285 to a position such that the contact of switch 288 will move from the full line position of FIG. 29 to dotted line position thereof. At that point, the slurry valve 291 will close due to the deenergization of relay 290. Instead, the relay 293 will be energized to open the water inlet valve 32. The valves are desirably close together so that the fresh water will clear the pipe of slurry.

The rotation of worm 73 during the admission of the slurry into tank 30 will have rotated worm gear 74 as well as worm gear 276. Both gears will continue to rotate as water enters the tank after the supply of slurry is cut off. Thus the ultimate position to which the switch 90 is rotated by the action of the float will represent a composite value of the slurry and water so that the liquid content of the slurry may be taken into consideration in the automatic integration of the water batch with the water content of the sand and the heat of the sand. Conceivably the entire content of the water batch measured into the tank 30 may be made up of slurry alone with no separate water. This would occur only in the event that the sand in the sand hopper proved exceptionally wet.

For fully automatic operation in accordance with the requirements of individual molders' hoppers at various stages, the following apparatus is provided.

In each of the molder's hoppers 535 and 545, from which individual molders withdraw their requirement for molding sand for making molds, I provide a pair of probes.

Those probes are associated with relays which have a predetermined differential response to close only when substantially the full predetermined length of the probes is exposed to wet sand, the relays reopening only when there remains but a nominal length of the probes exposed to sand through which current can pass from one probe to the other. Two separate arrangements for this purpose have been shown in FIG. 1. The first installation is one in which the hopper 535 is of relatively small depth. The probes 150 and 151 extend from top to bottom of the hopper. The relay 152 is of a well known type in which there is a substantial differential between the current required to close it and a much lower value of current flow above which it will not re-open. When the hopper 535 is substantially full of sand, the current passing between the probes 150 and 151 will energize the relay 152 to close the circuit to the solenoid air valve 153 to admit air to the cylinder 575 whereby to lift the plow 565 from the path of the layers of sand 525 advancing on conveyor 48. Not until the sand has almost all been discharged from the hopper 535 will the flow of current between the probes 150 and 151 become sufficiently low to permit relay 152 to re-open to close valve 153 and thereby to drop the plow 565 back into the hopper filling position in which it is shown in FIG. 1.

The installation in hopper 545 is similar in effect but, due to the great height of this hopper, the probes 150' and 151' are divided, having extensions 150'' and 151'' at the bottom of the hopper, the extensions being electrically connected with corresponding probe sections at the top of the hopper. The physical arrangement is shown in FIG. 1 and the electrical connections are diagrammed in FIG. 2, it being understood that the circuit and operation are essentially similar whether the probes are all in one continuous length as in hopper 535 or are divided as in hopper 545.

The transformer secondary at 159 supplies current across the probes through the coil 160 of the relay 152. This relay has a substantial differential of response due to the fact that the magnetic attraction of the armature by the coil is much stronger when the armature is close to the coil than it is when the armature is remote from the coil. Hence, instead of the solenoid type relay shown at some points in the electrical diagram, I have here shown an ordinary magnetic relay to assure the differential action. When the coil is energized to the degree which occurs when the sand substantially fully embeds the probes, the armature 161 is attracted sufficiently to engage the stationary contact 162, thereby energizing the solenoid coil 163 of relay 165 to close the circuit to the solenoid air valve 153 for lifting plow 565 and to open the circuit to conveyor motor 49 and also the circuit to the interval timer 170 and sequence controller 171 which control the measuring and mixing operations. It will be understood that the operating connections to the conveyor motor 149 and the interval timer and sequence controller are in multiple with connections from other hoppers exemplified in FIG. 2 by the conductors 166 and 167 so that the measuring, mixing and delivering mechanisms can be energized from any of the individual hoppers along the path of the conveyor belt.

When the plow 565 above any of the individual molder's hoppers is lowered to divert sand into the hopper, its corresponding relay 165 will be in the position shown in FIG. 2, with the circuits to the interval timer and the conveyor motor closed so that the mixing operations will be in process and the conveyor belt in operation. This can only happen, however, when the flow of current between the probes drops to a nominal value. In the case of the hopper 545, the length of the probe extensions at 150'' and 151'' is sufficient to pass through the damp sand a sufficient current to hold the relay 152 closed, with the plow raised. Only when the sand drops somewhat below the tops of the extension probes 150'' and 151'' will the current drop below the value necessary to hold relay 152 closed. Only then will the current from this particular set of probes activate the conveyor belt and the measuring and mixing apparatus and only then will the plow 565 of this particular hopper descend to re-fill the hopper with sand. Once the plow descends, due to the deenergization of the relay at 152, it will remain down, and the circuits controlling the mixing and delivery of sand will continue energized from this relay, until the sand reaches a point near the top of the hopper. In other words, most of the combined length of the probes and probe extensions is required for sufficient current flow to close the relay 152, while sand surrounding something less than the length of the extensions alone (or a correspondingly short length of integral probes 150 and 151) will permit sufficient flow to hold the relay shut.

The operation of the interval timer and sequence controller will now be described.

When coil 163 of relay 165 is deenergized to lower one of the plows 560, the contacts 172 and 173 are also closed to engage respectively the fixed contacts 174 and 175. Contacts 172 and 174 are in the circuit to the motor 49 of conveyor belt 48. Contacts 173 and 175 close a circuit through the series connected switches 128 and 141 and normally closed cam operated switches 177 and 178 to the sequence controller motor 180 (see FIGS. 2 and 7). By reason of the interlocking controls above described, sequence controller motor 180 will not start until an adequate batch of sand and an adequate batch of water are in readiness. As previously explained, in the circuit of FIG. 16, current to the interval timer is supplied through relay 204, subject to completion of the function of the integrating instrument. This is a substitute for the current supply to the timer through switches 128 and 141.

For hand operation in starting or otherwise, a crank may be applied to coupling 179 on sequence controller cam shaft 183 to operate such shaft without energizing its motor. A switch is also provided at 168 for switching from automatic to manual operation. In its dotted line position, it is in series with a push button switch 169 directly connected with the line and bypassing probes 150 and 151 and switches 128 and 141. When this arrangement is used, the closing of switch 169 will operate the mechanisms to produce and deliver sand as if there were demand at the hoppers 540 and regardless of the interlock switches 128 and 141. Each molder's hopper is also provided with a switch 164 for raising the corresponding plow if it is desired to empty the hopper, or when that station is not in use.

The motor 180 operates through a reducer 181 and gears 182 (FIG. 7) to drive the cam shaft 183 having cams 184, 1850, 1860, 1870, 1880, and 1890 (FIG. 1 and FIG. 7) operating through appropriate followers such as that shown at 190 in FIG. 13 for controlling the valves which open and close all the pneumatic circuits in proper sequence. Mechanically, the cam shaft may conveniently be mounted on a manifold 220 having internally an air pressure passage 221, connected with any suitable source of compressed air, and an air exhaust passage 222. Both passages extend longitudinally of the block. Extending through the block from front to rear are passages 223 and 224 leading to opposite ends of respective sets of ram cylinders. On the front of the block are twin valve housings 225 (FIG. 14) each of which has four valve seats respectively controlled by valves 226, 227, 228 and 229. Valves 226 and 228 are axially aligned and open in opposite directions. Valves 227 and 229 are similarly arranged. A passage 230 into which the valves 227, 229 open communicates through port 231 (FIG. 15) with the air pressure passage 221 of the manifold. Valve housing passage 232, from which valves 226 and 228 open outwardly, communicates through a port 233 with the exhaust passage 222 of the manifold 220.

Valve 226 opens outwardly into a passage 234 leading to the inside of the port controlled by valve 229. Similarly valve 228 opens outwardly into a passage 235 leading to the inside of the port controlled by valve 227. Passage 234 in the valve housing is thus adapted to receive pressure through valve 229 when the latter is open, or to be placed in communication with the exhaust passage 222 when valve 229 is closed and valve 226 is open. The passage 234, thus supplied either with pressure or exhaust connections, registers with the bore 223 extending through the manifold casting 220 and with which one end of one of the ram cylinders is connected.

Similarly passage 235 is subject to pressure when valve 227 is open as shown in FIG. 14 and communicates with the atmosphere when valve 228 is open, the latter valve being shown closed in FIG. 14. Passage 235 registers with the bore 224 of the manifold, which leads to the other end of the cylinder with which bore 223 communicates. Accordingly the piston in the ram cylinder can be operated in either direction when either end of the cylinder is subject to pressure and the other end to vacuum.

Mounted on the valve housing is a bracket 240, on which is pivoted a bell crank 241 carrying the cam follower 190 and bifurcated to provide arms 242 and 243 which lie between the ends of the opposed valve pairs as shown in FIGS. 13 and 14. The four valves in each valve housing connect the operating lines which communicate with bores 223 and 224 alternately with pressure and exhaust. The respective cams throw the bell crank 241 in one direction while the respective springs 244 acting through links 245 on the bell cranks hold the cam follower rollers 190 against the cams and throw the valves in the opposite direction.

Figure 8:
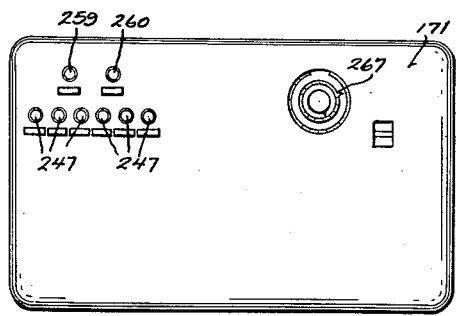
FIG. 8 is a view in front elevation on a reduced scale showing the device of FIG. 7 with its cover in place.
Figure 9:
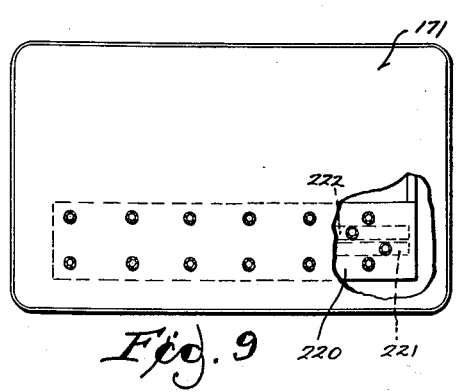
FIG. 9 is a view similar to FIG. 8 showing the device in rear elevation, a portion of the wall being broken away.

Each of the respective bores 223 is desirably provided with its own individual pressure switch at 246, the latter being connected to energize individual pilot lights at 247 as shown diagrammatically in FIG. 2. The pilot lights may be located as shown in FIG. 8. The lighting of a given lamp will indicate the functioning of the pressure controlled valve or gate operated by the ram to which air is supplied through one of the bores 223, wherein the admission of pressure immediately closes the corresponding switch 246.

Pilot lights 259 and 260 show operation of the sequence motor 180 and timer motor 270, respectively.

Figure 7:
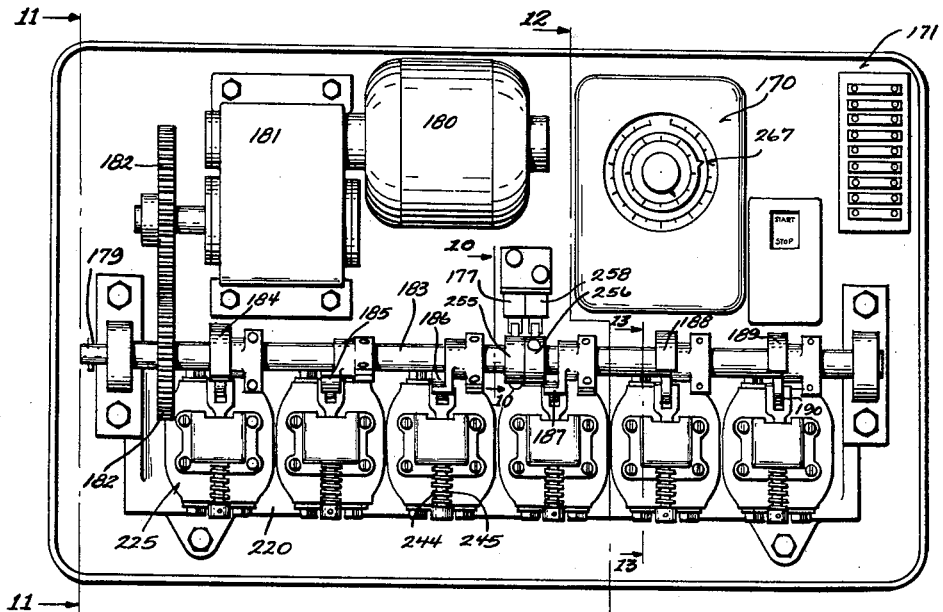
FIG. 7 is a view in front elevation of the interval timer and sequence controller with its cover removed.

In actual practice, the first cam from the left in FIGS. 1 and 7 is used to open the muller air exhaust damper 28 by supplying air to the cylinder 248 in a damper opening direction. The second cam 185 opens the damper 26 in the air input line from blower 23 into mixer 10, this being accomplished by applying pressure to the top of the cylinder 249 controlling damper 26.

The third cam 186 supplies air to the outer end of the cylinder 8' to operate the measuring valves which release a batch of powdered bond from the metering chamber 11 for delivery through pipe 17 into the hopper. The fourth cam 187 supplies air to the bottom of the cylinder 40 to lift the dump valve 43 for discharging water from the metering tank 30 into the mixer. The fifth cam 188 supplies air to the outer end of the cylinder 20 to close the sand supply gates 16 at the bottom of the bin and simultaneously supplies air to the inner end of cylinder 21 to open the sand discharge gate 19 at the bottom of the batch hopper for delivery of the sand batch into the mixer.

The cam 189 does not function until the mixing operation has been completed, as controlled by timer 170 in a manner hereinafter described, at which time it admits air to the inner end of cylinder 46 to open the gates 45 to discharge the mixed sand onto the conveyor apron 48.

The extent or dwell of the several cams is so chosen that the converse of the operation above described will occur in proper sequence as indicated in FIG. 32 wherein the relative periods for which the respective doors, valves or gates are open, and the interval timer is in operation, are diagrammatically shown.

Figure 10:
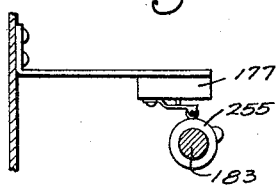
FIG. 10 is a detail view in section on the line 10—10 of FIG. 7.

In addition to the cams provided on shaft 183 for the control of the air connections, the said shaft carries cams 255 and 256 for controlling switches 177 and 258, respectively (FIGS. 7, 10 and 2). It is necessary that switch 177 be closed as a prerequisite to the operation of the sequence controller motor 180. At the end of the cycle, this switch opens to stop motor 180 unless there is a continued call for sand. In that case, and also to initiate the cycle, switch 177 is bypassed through switches 141 and 128, energized through the probe-controlled relay 152 of one of the molder's hoppers.

As the cam shaft rotates and ultimately opens switch 177 at the conclusion of the cycle of pneumatic operation of the measuring, mixing and delivery of the sand, cam 256 ultimately closes switch 258 to energize the relay 265. This relay breaks the circuit through its contact 178 to the sequence controller motor 180 and establishes a circuit through its contact 266 with the interval timer motor 270. The interval timer is a conventional piece of equipment having dials at 267 (FIG. 7 and FIG. 8) for determining its period of operation. When the timer motor has operated for the time for which it is set, it breaks its own circuit (by means not shown) thereby permitting relay 265 to return its contacts 266 and 178 back to the position of FIG. 2, whereby the circuit to the interval timer motor is again closed.

From the foregoing, it will be understood that the sequence control motor 180 and the interval timer motor 270 operate in alternation. The timer is at rest while the sequence controller is going through its cycle. At the conclusion of that cycle, the sequence controller motor stops after energizing the interval timer motor. The latter functions for whatever period is required for the mixing of the sand in the muller 10. If there is a demand for sand at the time the mulling operation is complete, the sequence controller motor 180 will take over immediately. If not, the entire system will come to rest until further demand exists.

All of the foregoing description has pre-supposed the use of a batch measuring hopper at 18. Instead thereof, a batch measuring conveyor may be used as shown in FIGS. 30 and 31. The conveyor 1800 operates through sand supply bin 1400. In the interest of accuracy the conveyor links or sections are provided with lapping side walls 210. These fit closely to the side margins of the bin so that, as in the device for feeding conveyor 48 in FIG. 1, the opening in the front of the hopper will level off the sand to an accurately predetermined level on the conveyor so long as there is sand in the bin. The thermometer probe 50 is the same as that previously described. The electrical resistance probes 1300 comprise plates held in spaced positions by tubular arms 211 through which the electrical connections are carried. Thus the electrical resistance and the temperature are constantly being measured at the outlet of the bin.

Since the sand is at a constant level on conveyor 210, a predetermined advance of the conveyor will invariably discharge a predetermined amount of sand into the mixer 10. Any arrangement for driving the conveyor for the selected distance of advance subject either to manual or automatic control will perform identically the same function as the opening of valve 16 to fill measuring hopper 18 and the subsequent closing of valve 16 and the opening of valve 19 to discharge a measured quantity of sand into the muller. It is, therefore, readily possible to connect the sequence controller above described to a motor 213 for operating the conveyor 1800 for the prescribed distance in each operation.

In practice, the pinion 154 is connected with one of the conveyor shafts to operate a gear 155 which carries a peg 156 for actuating a limit switch 157 which is in the holding circuit of relay 158 which controls the motor 213.

The starting switch 164, shown in FIG. 30, may be manually operated or may be controlled by the sequence controller. It closes contacts of relay 158 to start the motor to drive the conveyor for a distance to which the travel of peg 156 corresponds. Switch 164 will be understood to be normally open and to be re-opened as soon as the motor 213 starts. The holding circuit through the limit switch 157 will keep the relay contacts closed to maintain the motor in operation.

After one complete rotation of gear 155, the peg 156 will open the limit switch 157 and the motor driven operation of the conveyor will instantly cease consequent upon the opening of the contacts of relay 158.

The paddle 1330 performs the function of the paddle 129 in the batch measuring hopper 18. It hangs by gravity in a position in which the mercury switch 1320 mounted thereon is normally open. However, when the conveyor is loaded with sand to the prescribed level, the sand engages the paddle 1330 to tilt it to a position in which the switch 1320 is closed, thereby closing the circuit to permit the automatic functioning of the system.

The diagram in FIG. 32 shows a sequence of operations which is used in actual practice, it being understood that the specific intervals may be varied within substantial limits. If, for example, the conveyor of FIG. 30 is substituted for the batch measuring hopper of FIG. 1, the conveyor would be operated for the interval designated "Dump Gate Open" and this interval would be increased to any extent necessary to deliver the requisite quantity of sand. Inasmuch as sand in continuously supplied from the bin 1400 to the conveyor, the apparatus of FIGS. 30 and 31 would require nothing to correspond to the interval on the chart which is designated "Sand Fill Gate Open."

I claim:

1. In a system for measuring, mixing and delivering granular material, the combination with a hopper having discharge means, of a conveyor system leading to said hopper, electrical contacts exposed to granular material in the hopper, and an electrical circuit including said contacts and controlling said conveyor and including means for starting said conveyor when the material in the hopper falls to a predetermined level respecting said contacts, said contacts comprising an elongated probe having substantial vertical height in said hopper and the circuit including said contacts comprising a relay having a substantial differential between the amount of current required to close the relay and the amount of current below which the relay will re-open, the vertical height of the probe being such that the relay will close only when a substantial length of the vertically elongated probe is immersed in the material in the hopper and will open only when a much shorter length of the probe is exposed to such material, said circuit having contacts controlled by the relay and closed in the open position of the relay to effect delivery of material from the conveyor to the hopper when the relay is open and to interrupt such delivery when the relay closes.

2. In a device of the character described, the combination with a plurality of individual hoppers and a common granular material delivering conveyor serving said hoppers, of pairs of electrical contacts exposed to granular material in the individual hoppers, an electrical circuit including each pair of contacts; and means controlled by the flow of current between the contacts of an individual hopper for diverting material from the conveyor to said individual hopper when the material in the hopper falls below a predetermined level respecting a contact, in further combination with means for automatically mixing and supplying material to said conveyor, and means for rendering the automatic mixing and supplying means operative upon the delivery of material by said conveyor to any one of several hoppers served thereby, the means for automatically mixing and supplying material to said conveyor comprising a material mixer, measuring means for material ingredients and means for the cyclic operation of the measuring means and mixer, said mixer having a port for the delivery of material onto the conveyor, said conveyor operating from said mixer to the individual hoppers as aforesaid, said measuring means comprising a plurality of batch measuring means, said means for cyclic operation comprising a motor driven sequence controller, valves with which the several batch measuring means are provided, said valves having actuated connections driven from said controller, and a timer, the timer and controller each having means for interrupting its own operation and rendering the other operative, the timer being set for an interval required for the functioning of the mixer, at the conclusion of which the sequence controller becomes operative to regulate measuring and delivery to the mixer of batches of ingredients required for a successive mixer operation.

3. The device of claim 2 in which at least one of said batch measuring means has a metering control including an integrating device having actuating connections for determining the operation of the control in accordance with physical conditions of the material in another batch measuring means.

4. The device of claim 3 in which the actuating connections for said integrating device comprise a slave motor, a master motor operatively associated with said slave motor and an electric circuit for control of said master motor including forward and reverse contacts and a contact arm movable between said contacts, and means for moving said contact arm in response to the physical condition of the material in said other batch measuring means.

5. The device of claim 4 in combination with a mounting for said forward and reverse contacts on which they are movable in the direction of contact arm movement, said master motor having a shaft connection with said mounting whereby the contact mounting is moved in a direction to tend to center the contact arm between said forward and reverse contacts whenever a circuit to the master motor is completed by engagement of said contact arm with one of said forward and reverse contacts.

6. The combination with granular material container means including a hopper and a mixer, water supply means having a discharge connection to the mixer, electric moisture probe contact means and temperature measuring means exposed to material in said container means, a valve for said water supply means and means for actuating the valve including integrated connections to the probe means and the temperature measuring means for actuating the valve at such time as the water flowing through the valve will be interrelated to the moisture content and temperature of the material in the container means, said integrating device comprising a variable resistance, and means for varying such resistance proportionately to the water content of the material, and means for balancing the varied resistance against the resistance to the flow of electrical current through said material to the probe contact means, and means for actuating the valve to limit the flow of water therethrough when a proper amount has been measured thereby as determined by such balancing.

7. In a device for automatically measuring, mixing and delivering granular material, the combination with measuring and mixing devices having filling and discharge valves requiring sequential control, of a sequence controller having a driving motor and cam shaft and a series of cams with operating connections with the several valves, a timer having a motor, an electrical circuit for said motor including remote control switch means for opening and closing the circuit to initiate a cycle of operations, said circuit further including switch means controlled by the sequence controller and connected with the timer motor to control operation thereof, and switch means self-closing upon conclusion of the operation of the timer motor for placing the sequence controller motor in the circuit, the said motors being automatically operable in alternation, whereby the timer motor determines a period of dwell during which the sequence controller motor is inoperative.

8. In a device of the character described, the combination with a granular material feeding device and a water measuring device having a valve, of a granular material characteristic-measuring instrument exposed to granular material in the granular material feeding device, a motor controlled by said instrument, a rheostat having a moving contact connected with the motor to be moved thereby, means whereby said instrument establishes a predetermined electrical resistance dependent upon the material characteristic measured thereby, means for establishing current flow through said resistance, a relay having a contact closed by said flow, a circuit controlled by said contact and including electromagnetic means for the opening of said valve, the said rheostat being connected in circuit with the resistance first mentioned whereby the advance of the moving contact of the rheostat will ultimately reduce flow of current below that required to maintain said relay closed, whereby the closing of the valve will be a function of the characteristic of material measured by said instrument.

9. The device of claim 8 in which said circuit comprises means operative upon the closing of said valve to reverse the operation of the moving contact of the rheostat and to move the rheostat back to its starting point.

10. In a device of the character described, the combination with a granular material batch measuring hopper, water supply means and a mixer into which said hopper and water supply means discharge, of infinitely variable means for integrating the amount of water supplied by said means with the material in the hopper according to the wetness and temperature of the material, said integrating means consisting of temperature sensitive means exposed to the sand, electrical contacts exposed to the sand in the hopper, means for passing a current between said contacts in proportion to the electrical resistance of the sand, a relay in circuit with said contacts to be closed by the current flowing therethrough, said relay being adapted to reopen when said current drops below a given value, a variable resistance in circuit with the relay and said contacts, a motor having electrical connections controlled by said relay to operate when said relay is closed, a valve controlling water supplied by said water supply means and having electromagnetic operating connections, said motor being connected with said variable resistance to gradually increase the resistance as the motor operates, the increase in resistance gradually reducing the current flow between said contacts to a value such that said relay opens, said valve actuating connections including parts connected with said motor to be re-set thereby, and means in the circuit to the electromagnetic means for operating the valve which includes a switch bodily movable in accordance with the temperature of the sand in said hopper whereby the actual time of valve closing is dependent both on the electrical resistor and the temperature of such sand.

11. The device of claim 10 in further combination with means for supplying slurry comprising bonding material and water, valve means for admitting slurry to said water supply means, and means for admitting a predetermined quantity of slurry to said water supply means in advance of the opening of the water valve first mentioned.

12. The device of claim 11 in further combination with an actuator for said switch and comprising a slave motor, a master motor operatively associated with said slave motor and an electric circuit having means responsive to changes in sand temperature for control of said master motor.

13. The device of claim 12 in which said electric circuit includes forward and reverse contacts and a contact arm movable between said contacts and thermometer actuated means for moving said contact arm in response to changes in sand temperature.

14. The device of claim 13 in combination with a mounting for said forward and reverse contacts on which they are movable in the direction of contact arm movement, said master motor having a shaft connection with said mounting whereby the contact mounting is moved in a direction to center the contact arm between said forward and reverse contacts whenever a circuit to the master motor is completed by engagement of said contact arm with one of said forward and reverse contacts.

15. In a device to add water to granular material, means to predetermine the amount of water in accordance with the temperature of the granular material and comprising a water valve, electric valve actuator and an electric control circuit for said electric valve actuator, said electric control circuit comprising a slave motor having an armature shaft and shaft connections comprising means for actuating said valve, a master motor operatively associated with said slave motor and an electric circuit for control of said master motor including forward and reverse contacts and a contact arm movable between said contacts, thermometer means responsive to changes in granular material temperature and thermometer actuated means for moving said contact arm toward one or another of said contacts in response to changes in granular material temperature.

16. The device of claim 15 in combination with a mounting for said forward and reverse contacts on which they are movable in the direction of contact arm movement, said master motor having a shaft connection with said mounting whereby the contact mounting is moved in a direction to tend to center the contact arm between said forward and reverse contacts whenever a circuit to the master motor is completed by engagement of said contact arm with one of said forward and reverse contacts.

17. In a granular material mixing system, the combination with a mixer, a granular material batch container, means for measuring the moisture content of granular material in the container, and means for measuring a quantity of water to be mixed therewith in the mixer, of a paddle disposed in the path of granular material in the container and yieldably mounted to be displaced by granular material in the container when the granular material reaches a predetermined level and a switch connected with said paddle and having an electrical circuit controlled thereby, said circuit including means for precluding the introduction of water into the mixer in relation to the measured water content of the granular material until the batch container is filled to a predetermined depth at which the granular material displaces the paddle, thereby assuring the presence of the quantity of granular material appropriate to receive the amount of water related to the water content of the granular material, such amount being predetermined to be usable with a given amount of granular material of such content.

18. The device of claim 17 in which said container comprises a conveyor and a granular material hopper thereover, the hopper having means for delivering granular material onto the conveyor at a predetermined depth, said paddle being disposed in advance of the hopper in the direction of conveyor movement and exposed to granular material on the conveyor at such depth.

19. The device of claim 18 in which the conveyor is provided with a driving motor and a member connected with the conveyor and motor to be operated for a length of travel proportionate to conveyor advance, a motor circuit including a holding relay, and a relay holding circuit including a limit switch having an actuator in the path of said member whereby the engagement of said member with the limit switch actuator in each advance of said conveyor opens the holding circuit of said relay to stop said motor and conveyor, said relay having means other than said limit switch for initiating motor operation.

20. The combination with a source of water and granular material container means including a hopper and a mixer into which said hopper and water source have discharge connections, electrical moisture probe contact means and temperature measuring means both exposed to granular material in the granular material container means, a valve for measuring water for said water source and means for actuating said valve and including integrating connections to the probe means and the temperature measuring means for actuating the valve to pass a measured quantity of water interrelated to the moisture content and the temperature of the granular material in the container means, said integrating device including an electrical element and means for adjusting the electrical characteristic of said element in accordance with a characteristic of the granular material in the container means, the valve actuating means constituting means dependent on the ultimate setting of said element to determine the amount of water measured by said valve in accordance with the need for said water as reflected by said setting.

21. The combination with apparatus for preparing granular material for delivery to a hopper and including granular material treatment means for cyclically measuring the moisture content and temperature of the granular material and mixing the granular material with an amount of water proportioned to such measurements, of control means for initiating the cycle of said granular material treatment means in response to ultimate demand for granular material at said hopper and including granular material level sensing means in said hopper and means responsive thereto for initiating said cycle when the granular material drops to a predetermined level in the hopper.

22. The device of claim 21 in which said level sensing means comprises electric contacts exposed to granular material in the hopper.

23. The device of claim 21 in which said apparatus further includes a mixed granular material container and a conveyor for conveying granular material from the container to the hopper, said control means further including means for actuating said conveyor concurrently with initiating the cycle of the treatment means.

24. The device of claim 22 in further combination with a plow adapted to plow granular material from said conveyor into said hopper and a motor for selectively advancing and retracting said plow with respect to said conveyor, said control means further including means for advancing said plow concurrently with initiating the cycle of the treatment means.

25. The combination with apparatus for preparing granular material for delivery to a hopper and including treatment means for cyclically measuring the moisture requirements of the granular material and mixing the granular material with an amount of water proportioned to such requirements, of control means for initiating the cycle of said treatment means in response to ultimate demand for granular material at said hopper and including material quantity sensing means in said hopper and means responsive thereto for initiating said cycle when the material in said hopper drops below a predetermined quantity.

References Cited in the file of this patent

UNITED STATES PATENTS

| | | |
|---|---|---|
| 1,276,039 | Dosch | Aug. 20, 1918 |
| 2,273,126 | McGillan | Feb. 17, 1942 |
| 2,537,005 | Brown et al. | Jan. 9, 1951 |
| 2,638,248 | Alvord | May 12, 1953 |
| 2,674,381 | Cady | Apr. 6, 1954 |
| 2,709,843 | Hartley | June 7, 1955 |

FOREIGN PATENTS

| | | |
|---|---|---|
| 593,563 | Great Britain | Oct. 20, 1947 |
| 628,336 | Great Britain | Aug. 26, 1949 |